US006849984B2

(12) United States Patent
Gallant

(10) Patent No.: US 6,849,984 B2
(45) Date of Patent: Feb. 1, 2005

(54) MAGNETICALLY DRIVEN WHEEL FOR USE IN RADIAL/ROTARY PROPULSION SYSTEM HAVING AN ENERGY RECOVERY FEATURE

(76) Inventor: Raymond Joseph Gallant, 480239 Walahole Valley Rd., Kaneohe, HI (US) 96744

( * ) Notice: Subject to any disclaimer, the term of this patent is extended or adjusted under 35 U.S.C. 154(b) by 569 days.

(21) Appl. No.: 09/771,662

(22) Filed: Jan. 30, 2001

(65) Prior Publication Data

US 2001/0004174 A1 Jun. 21, 2001

Related U.S. Application Data

(63) Continuation-in-part of application No. 09/265,847, filed on Mar. 10, 1999, now abandoned.
(60) Provisional application No. 60/103,898, filed on Oct. 13, 1998.

(51) Int. Cl.$^7$ .......................... H02K 1/27; H02K 23/54; H02K 16/04; H02K 21/24
(52) U.S. Cl. .................. 310/178; 310/156.32; 310/113; 310/268; 180/65.1; 180/65.5
(58) Field of Search ................................. 310/113, 178, 310/268, 156.32–156.37; 180/65.1, 65.4, 65.5

(56) References Cited

U.S. PATENT DOCUMENTS

| | | | | |
|---|---|---|---|---|
| 3,566,165 A | * | 2/1971 | Lohr | 310/67 R |
| 3,832,581 A | * | 8/1974 | Hoffmann et al. | 310/46 |
| 4,042,056 A | * | 8/1977 | Horwinski | 180/65.2 |
| 4,179,633 A | | 12/1979 | Kelly | 310/80 |
| 4,211,945 A | * | 7/1980 | Tawse | 310/112 |
| 4,922,145 A | * | 5/1990 | Shtipelman | 310/49 R |
| 5,164,623 A | * | 11/1992 | Shkondin | 310/67 R |
| 5,179,307 A | * | 1/1993 | Porter | 310/68 B |
| 5,191,255 A | * | 3/1993 | Kloosterhouse et al. | 310/156.38 |
| 5,258,697 A | * | 11/1993 | Ford et al. | 318/498 |
| 5,330,026 A | * | 7/1994 | Hsu et al. | 180/181 |
| 5,600,191 A | | 2/1997 | Yang | 310/67 R |
| 5,719,458 A | | 2/1998 | Kawai | 310/156 |
| 5,786,645 A | * | 7/1998 | Obidniak | 310/68 R |
| 6,323,576 B1 | * | 11/2001 | Applegate | 310/268 |

FOREIGN PATENT DOCUMENTS

| | | | | |
|---|---|---|---|---|
| GB | 962322 | * | 7/1964 | |
| GB | 2229866 | * | 3/1990 | H02K/31/00 |

* cited by examiner

*Primary Examiner*—Karl Tamai
(74) *Attorney, Agent, or Firm*—Siemens Patent Services LC

(57) ABSTRACT

The radial/rotary propulsion system of the present invention features a flywheel having concentric rings of permanent magnets attached to one or both sides. These permanent magnets interact with DC powered electromagnets which, when selectively energized, impart rotary motion to the flywheel. By arranging the permanent magnets in concentric rings, better control of both speed and torques may be obtained. In addition, in a regenerative mode, inertia of the flywheel is reconverted to electrical energy by either additional permanent magnet/coil combinations or through the switching of the electromagnet coils normally used for rotating the flywheel. In alternated embodiments, regeneration is accomplished with alternators interacting with other magnets of the flywheel. The regenerative mode is also helpful in braking the flywheel as its inertial energy is converted to electrical energy. The energy recapture feature is particularly useful when the flywheel is utilized in a self-propelled vehicle powered by self-contained batteries.

19 Claims, 6 Drawing Sheets

MAGNETICALLY DRIVEN WHEEL FOR USE IN RADIAL/ROTARY PROPULSION SYSTEM HAVING AN ENERGY RECOVERY FEATURE

RELATED APPLICATIONS

This application is a Continuation-in-Part of abandoned U.S. patent application Ser. No. 09/265,847, filed Mar. 10, 1999, which was in turn a Continuation of U.S. Provisional patent application Ser. No. 60/103,898, filed Oct. 13, 1998.

BACKGROUND OF THE INVENTION

1. Field of the Invention

The present invention relates to a magnetically driven flywheel or wheel and, more particularly, the invention features a flywheel equipped with rings of permanent magnets adapted to interact with external, DC, capacitive discharge powered electromagnets to rotate the flywheel. Energy recovery is by the inertia of the flywheel propelling alternators used to generate electrical power to recharge a battery.

2. Description of the Prior Art

A magnetic wheel drive is described in U.S. Pat. No. 4,179,633 for MAGNETIC WHEEL DRIVE; issued to Donald A. Kelly on Dec. 18, 1979. Kelly teaches a wheel having a series of permanent magnets radially disposed along its circumference. These permanent magnets are arranged to interact with a series of pairs of permanent magnets placed on oscillating, toggle bars powered by an external motive force. The "flipping" of the toggle bars alternately place the north and south poles of the magnet couples in close proximity to the permanent magnets on the wheel. By synchronizing the toggling of the fixed magnets, alternate north and south poles attract oncoming, rotating wheel magnets. By controlling the speed of the toggling, the rotational speed of the wheel may be controlled.

In contradistinction, the radial/rotary propulsion system of the instant invention requires no external, toggling of permanent magnet couples. Unlike KELLY, the inventive radial rotary propulsion system uses DC energized electromagnets in a repulsion only modality. The inventive apparatus uses permanent magnets on a flywheel in rings of varying diameters which, in turn, interact with selectively with the DC, capacitive discharge powered electromagnets on one or both sides of the rotating flywheel. The use of concentric rings of permanent magnets helps simplify the speed control of the device and allows more efficient operation over a range of torque requirements. In addition, when the flywheel is not being powered, the inertia of the flywheel allows generation of electrical power which may be used to recharge the battery normally used to power the electromagnets. This helps to re-energize the system so that it can be used for vehicle propulsion or in other similar applications, while decreasing the total drain from the battery system.

U.S. Pat. No. 5,600,191 for DRIVING ASSEMBLY FOR MOTOR WHEELS; issued Feb. 4, 1997 to Chen-Chi Yang, teaches another apparatus for magnetically imparting rotary motion to a wheel. Yang also uses permanent magnets radially arranged at the circumference of a stator (wheel) to interact with external electromagnet coils. A clutch mechanism is provided to selectively couple the rotary motion to an axle. The present invention, on the other hand, utilizes permanent magnets embedded in, or mounted on one or both faces of a flywheel and arranged in concentric rings of varying diameters which, in turn, interact with selectively energizable electromagnets, also arranged in concentric rings so as to interact with corresponding rings of permanent magnets on the flywheel. In the inventive radial/rotary propulsion system, magnetic interaction between the permanent and the electromagnets is always repulsive, unlike YANG who relies upon an arrangement of north-south poles to provide a attraction/repulsion mode of operation. Regenerative elements allow recapture of inertial energy of the flywheel for the purpose of recharging a battery.

In U.S. Pat. No. 5,719,458 for POWER GENERATOR WITH IMPROVED ROTOR; issued Feb. 17, 1998 to Teruo Kawal, another apparatus for imparting rotary motion to a wheel is described. KAWAL utilizes an AC current, preferably three-phase AC, to energize electromagnets to create an alternating magnetic field which interacts with semicircular pole pieces on the perimeter of the wheel. Unlike Applicant's nonmagnetic wheel, the KAWAL wheel is itself, a relatively complex magnetic structure. The KAWAL system relies upon an alternating north-south pole arrangement to implement an attraction/repulsion mode of operation. The present invention, on the other hand, utilizes a DC, capacitive discharge system to selectively energize the electromagnets which interact with concentric circles of permanent magnets, all having the same polarity within any given magnet ring, the inventive system operating in a repulsion only mode. Also, unlike the KAWAL pole pieces, the permanent magnets of the instant invention need have no special physical shape (i.e., they need not be semicircular, etc.).

While in each one of these prior art inventions, apparatus for imparting rotary motion to a wheel through the interaction of permanent magnets with a magnetic field from electromagnets is described, none of the above inventions and patents, taken either singly or in combination, is seen to describe the instant invention as claimed

SUMMARY OF THE INVENTION

The radial/rotary propulsion system of the present invention features a flywheel having concentric rings of permanent magnets attached to or embedded in one or both faces. These permanent magnets are arranged on the flywheel such that all magnets in a ring on a given face have the same polarity (i.e., they are all either north or south poles). The magnets interact with DC powered electromagnets which, when selectively energized, typically using capacitive discharge energization, to provide magnetic fields which impart rotary motion to the flywheel. By arranging the permanent magnets in concentric rings and using repulsion only operation, better control of both speed and output torque may be obtained. The use of narrow pulse width DC pulses, such as may be obtained from a capacitive discharge type power supply, also helps to control the inventive radial/rotary propulsion system and facilitates operation at high speed, for example at speed in the vicinity of 6000 rpm. By using narrow, high-energy pulses, necessary energy for high-torque output may be obtained with still operating at high rotational rates. In addition, in a regenerative mode, inertia of the flywheel is reconverted to electrical energy by either additional permanent magnet/coil combinations, or through the switching of the electromagnet coils normally used for rotating the flywheel, or by alternators positioned on the flywheel housing and tensioned against the flywheel. The energy recapture feature is particularly useful when the flywheel is utilized in a self-propelled vehicle powered by self-contained, rechargeable batteries.

Accordingly, it is a principal object of the invention provide a magnetically powered, rotary propulsion system.

It is an additional object of the invention to provide a magnetically powered, rotary propulsion system utilizing a flywheel made from a dense, magnetically nonconductive material.

It is another object of the invention to provide a magnetically powered, rotary propulsion system utilizing permanent magnets mounted on or embedded in the flat faces of the flywheel.

It is a further object of the invention to provide a magnetically powered, rotary propulsion system wherein the permanent magnets on the flat faces of the flywheel are arranged in concentric rings.

It is a still further object of the invention to provide a magnetically powered, rotary propulsion system wherein the permanent magnets in any ring all have the same polarity.

Still another object of the invention is to provide a magnetically powered, rotary propulsion system wherein the concentric rings of magnets interact with selectively energized, DC powered electromagnets.

It is an additional object of the invention to provide a magnetically powered, rotary propulsion system wherein the selectively energized, DC powered electromagnets are energized using a capacitive discharge energization system.

An additional object of the invention is to provide a magnetically powered, rotary propulsion system having the ability to recapture inertial flywheel energy as electrical power.

It is again an object of the invention to provide a magnetically powered, rotary propulsion system suitable for use in powering a self-propelled vehicle.

It is another object of the invention to provide a magnetically powered, rotary propulsion system wherein the magnetically driven flywheel is directly attached or forms a part of the wheel of a self-propelled vehicle.

Yet another object of the invention is to provide a magnetically powered, rotary propulsion system suitable for use in powering a self-propelled vehicle either by direct wheel drive or a motor incorporating the magnetically powered, rotary propulsion flywheel.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
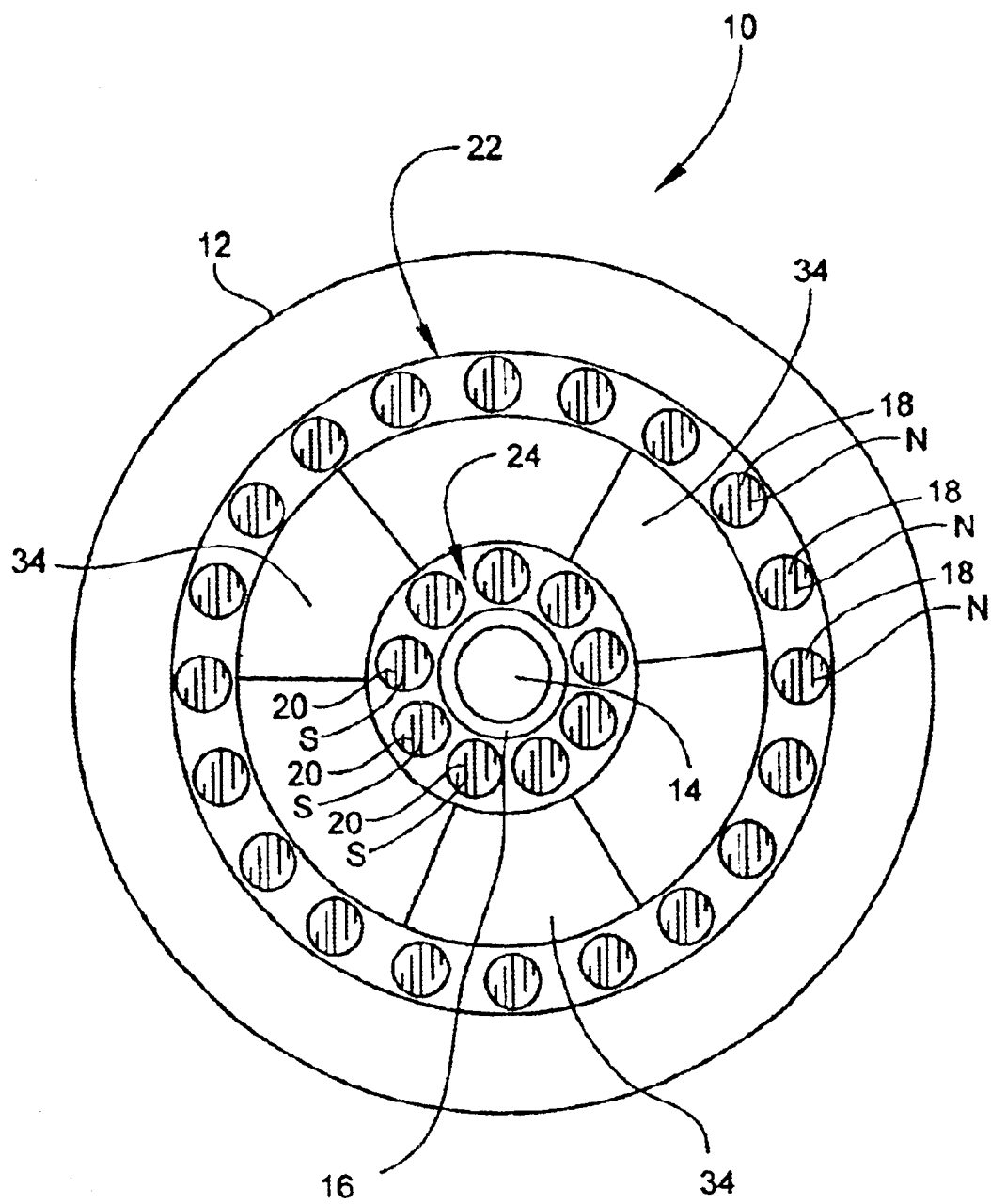
FIG. 1 is a plan view of the permanent magnet equipped flywheel of the invention.
Figure 2:
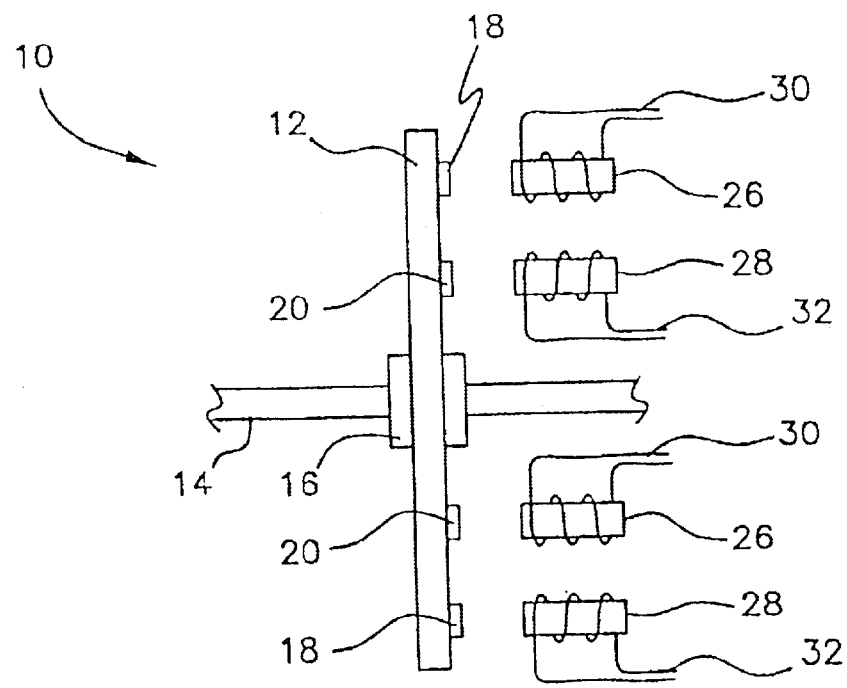
FIG. 2 is a side schematic of the radial/rotary propulsion system utilizing the flywheel shown in FIG. 1.

Referring first to FIGS. 1 and 2, there are shown a plan view and a side view, respectively, of a first embodiment of the radial/rotary propulsion system of the present invention, generally at reference number 10. A flywheel 12 is shown mounted on axle 14 through bearing assembly 16. Bearing assembly 16 is typically a one-way bearing to allow rotation of flywheel 12 in a single, predetermined direction and/or to allow coupling of the rotational motion of flywheel 12 to axle 14. Making bearing 16 a one-way bearing simplifies the electrical control (not shown) and guarantees rotation of flywheel 12 in a known direction at start-up. If a two-way bearing is used, an additional mechanism (not shown) for coupling the rotational motion of flywheel 12 to axle 14 must be provided. Such mechanisms are well known to those skilled in the art. Flywheel 12 is composed of a dense but magnetically nonconductive material. Brass, bronze, or certain nonmagnetic stainless steel alloys have been found suitable. A composite structure having a dense material such as lead bonded between structurally rigid plates could also be employed. The greater the mass of flywheel 12, the smoother the performance of the inventive radial/rotary propulsion system. Bearing assembly 16 allows flywheel 12 to rotate freely about axle 14 in a single, predetermined direction, assuming that bearing assembly 16 is a one way bearing. Permanent magnets 18, 20 are affixed to a side surface (i.e., face) of flywheel 12. Magnets 18, 20 may be affixed to flywheel 12 using a structural adhesive or any mechanical fastening means suitable to withstand the centrifugal forces to which the magnets 18, 20 are subjected. Such fastening means are well known to those skilled in the art. Magnets 18 are arranged in a substantially circular pattern at a first radius from the center of axle 14 forming a first magnet group 22. Likewise, magnets 20 are arranged in a substantially circular pattern at a second, smaller radius from the center of axle 14. Any number of magnets may be used in first magnet group 22 or second magnet group 24, although an even number is preferable, the magnets 18, 20 being arranged so that all magnets in magnet groups 22, 24 present the same polarity (i.e., the poles presented for interaction with external electromagnets are all are north poles or all are south poles). Permanent magnets 18, 20 must be spaced far enough apart around the face of flywheel 12 so as to provide a break in the magnetic fields generated by adjacent magnets. If sufficient space is not provided, either the inventive system will not operate at all, or will operate inefficiently. Permanent magnets 18, 20 may be provided on one or both faces of flywheel 12.

Figure 6:
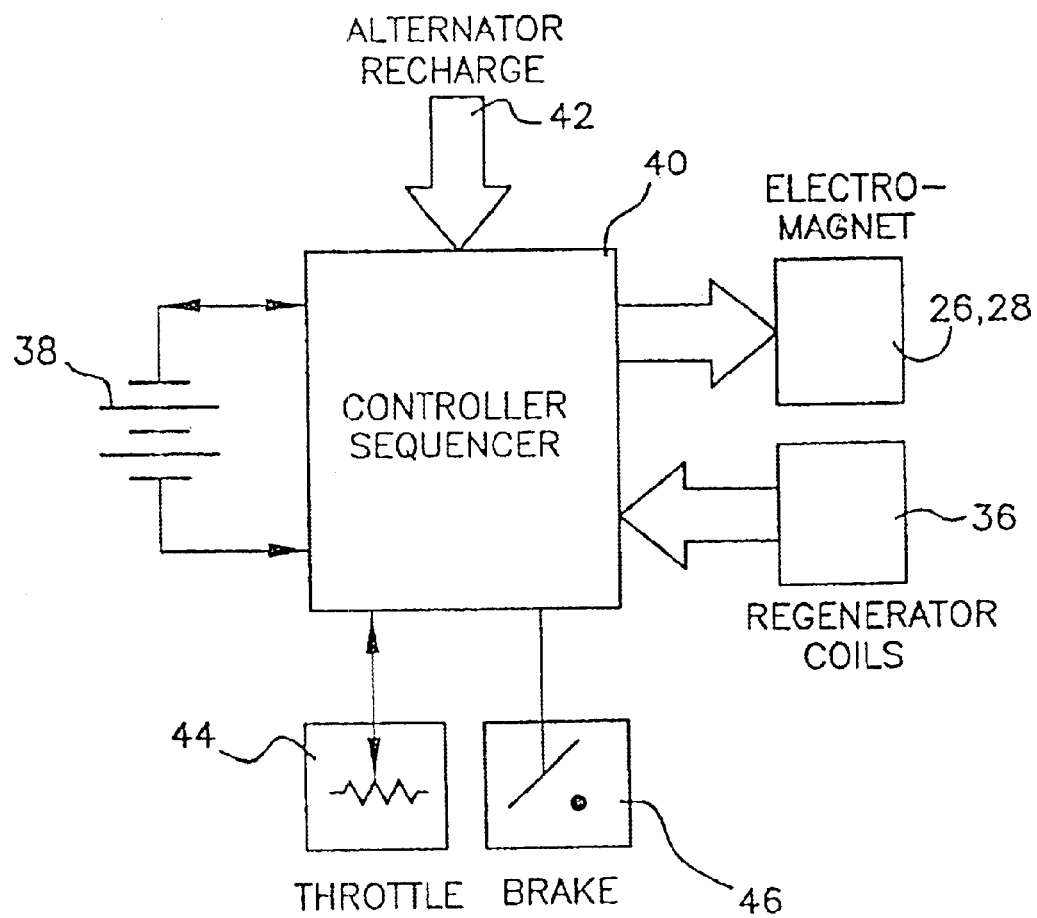
FIG. 6 is a system schematic block diagram of a control system for an electrically powered vehicle using the radial/rotary propulsion system of the invention.

A series of electromagnets 26, 28 are positioned with their poles as close as possible to the first magnet group 22 and second magnet group 24, respectfully. Electrical leads 30, 32 are connected to a controller/sequencer 40 (FIG. 6) which selectively applies power, generally from a capacitive discharge power supply circuit (not shown), typically forming a part of controller/sequencer 40. Power for electromagnets 26, 28 is provided by battery 38 (FIG. 6). By properly sequencing and controlling the pulse width and amplitude of the DC pulses applied to electromagnets 26, 28, the rotational speed and torque output from the radial/rotary propulsion system may be controlled. If a two-way (not one-way) bearing assembly 16 has been used, the direction of rotation may also be controlled. The use of short duration pulses facilitates high speed operation. By using a capacitive discharge type power supply, even with narrow pulses, enough energy may be imparted to the flywheel to maintain high torque output at these high operating speeds. Typically, magnets diametrically opposed (i.e., 180° apart from one another on the flywheel) are pulsed simultaneously. This minimizes lateral thrust forces on bearing 16 and thereby prevents excessive wear on bearing 16 as well as minimizing friction among bearing 16, flywheel 12 and axle 14.

Figure 8:
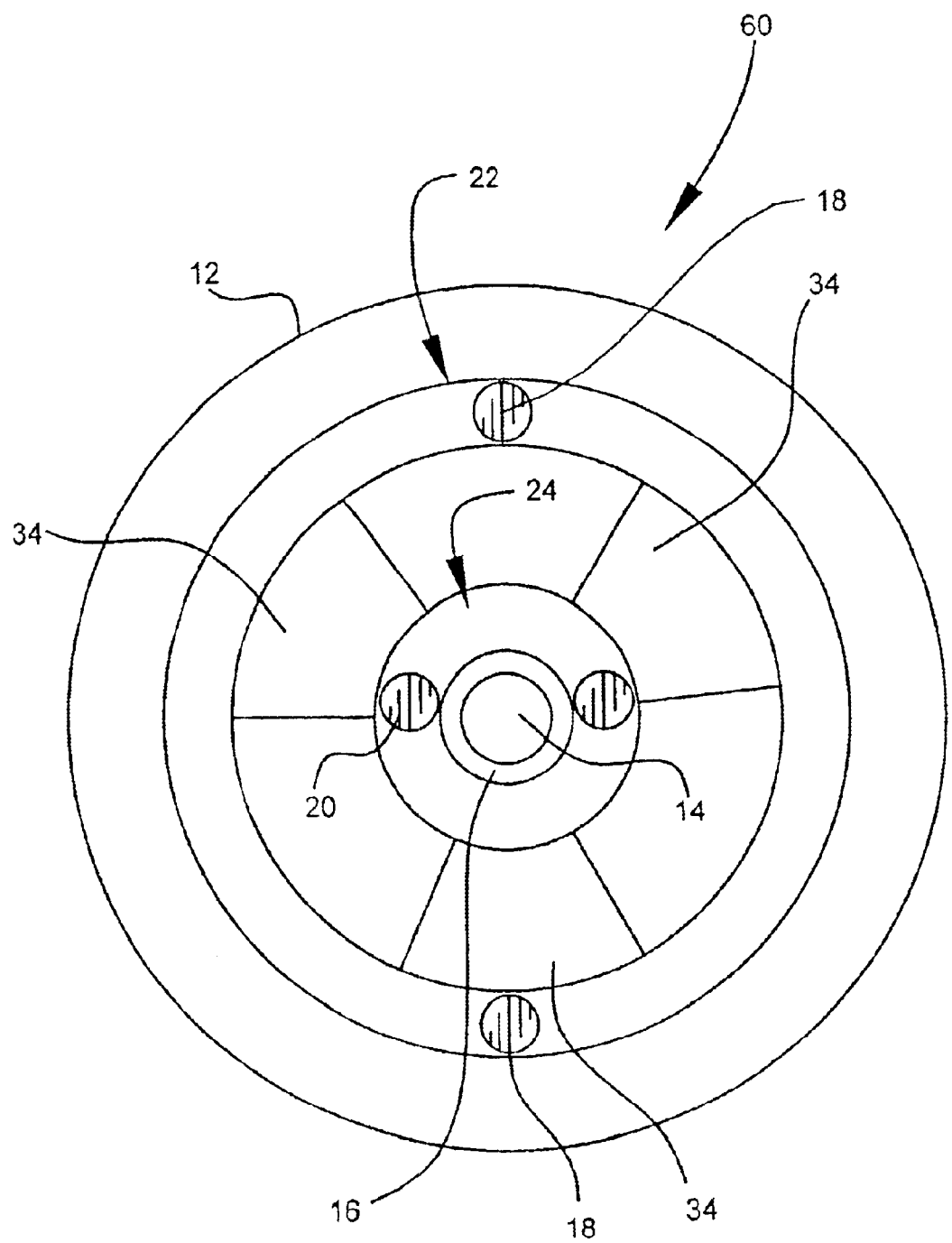
FIG. 8 is a schematic, plan view of an alternate, simplified embodiment of the magnet equipped flywheel shown in FIG. 2.

Referring now to FIG. 8, there is shown a plan view of a simplified embodiment of the present invention, generally at reference number 60. In this simplified embodiment, flywheel 12 is connected to axle 14 by means of bearing 16. Magnet group 22, however, consists of only two magnets 18, disposed on flywheel 12 diametrically opposed to one another. Likewise, magnet group 24 consists of only two magnets 18, also shown diametrically opposed to one another. While magnet groups 22 and 24 are depicted having an orthogonal relationship to one another, it should be obvious to those skilled in the art that any angular relationship between magnet groups 22 and 24 could be chosen to meet a particular operating requirement or circumstance. Likewise, a combination of the embodiment of FIGS. 1 and 2 with the embodiment of FIG. 8 could also be created. Such an embodiment (not shown) could have two magnets in magnet group 22 and a large number of magnets in magnet group 24, or vice-versa.

Referring now again to FIGS. 1 and 2, it is important that a spacing between individual magnets 18 and 20 be chosen so that any magnetic interference between adjacent magnets is held below a critical operating threshold. Failure to provide sufficient spacing between magnets 18, 20 may, worst case, prevent operation of the inventive propulsion system. If insufficient spacing is provided, the system may be partially operative but efficiency and/or range of control may suffer.

The radial/rotary propulsion system of the instant invention also features a regeneration system to recapture electrical energy from flywheel inertia during a coast (non driven) mode of operation. Typically the regeneration is implemented using separate components (i.e., magnets, pick-up coils, alternators, etc.) than those used to drive flywheel 12. This will be described in detail hereinbelow. It is possible, however, by using appropriate control circuitry (not shown), to utilize the drive components, particularly electromagnets 26, 28 so that when they are no longer operating in a driven mode, they may be used in a reverse process during a coast (non driven or recovery) mode of operation, to recapture the inertia of flywheel as electrical energy. The recaptured energy may be used to partially recharge battery 38 (FIG. 6). In one embodiment, permanent magnets 18 and/or 20 interact with electromagnets 26, 28, respectively, to act as a generator. This requires a special switching arrangement (not shown) in controller/sequencer 40 (FIG. 6) to accomplish this function. Such switching arrangements are well known to those in the electrical engineering arts and form no part of the instant invention. In alternate embodiments, additional magnets and coils, as are described in detail hereinbelow, may be used to perform the regeneration function.

Figure 3:
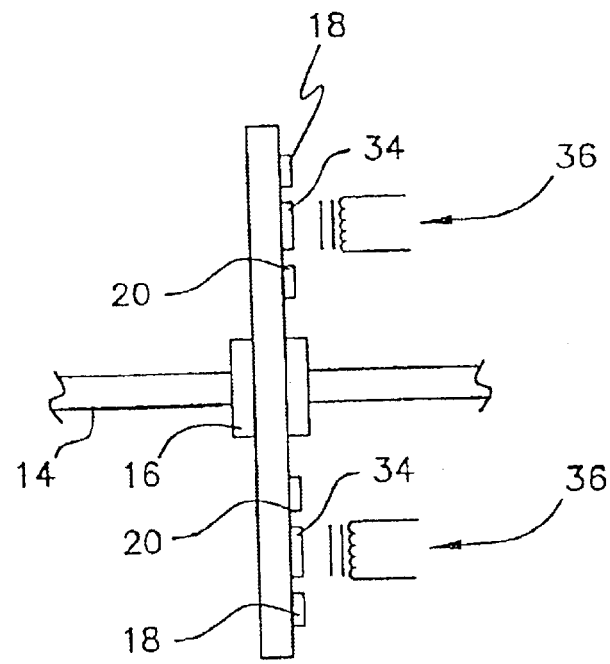
FIG. 3 is a side schematic of the radial/rotary propulsion system showing an energy recapture mechanism including alternators for electrical regeneration.

More typically, separate components are used to implement the regeneration mode. Referring now to FIG. 3, there is shown a schematic view of an alternate embodiment of the regeneration system. In an this embodiment, an additional set of permanent magnets 34, also arranged in a substantially circular pattern, typically at a radius between the two radii associated with magnets 18 and 20, are also affixed to flywheel 20. Special alternator pick-up coils 36, optimized as electrical generating structures are deployed as nearly as possible to magnets 34. In this embodiment, no special switching arrangement of electromagnets 26, 28 is required and simple regeneration circuitry (not shown), well known to those skilled in the circuit design art, my be used. The regeneration circuit also serves as a brake for flywheel 12 because, as inertial energy is converted to electrical energy, the rotation of flywheel 12 is slowed and, ultimately, stopped. This is useful when the radial/rotary propulsion system of the invention is used to power a land vehicle by direct wheel power application. Energy which would normally be wasted may be scavenged by the regeneration system, thereby both saving wear on mechanical brakes and allowing a greater operating range for the vehicle between battery charges.

Figure 4:
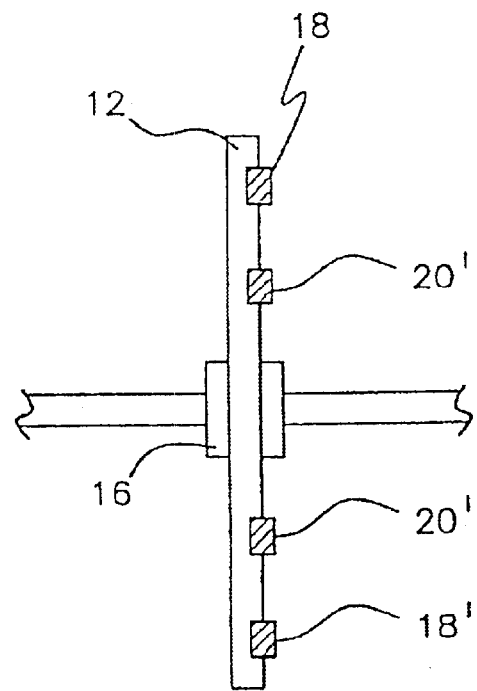
FIG. 4 is a side view of the permanent magnet equipped flywheel of the invention showing partially embedded magnets.

Referring now to FIG. 4, magnets 18', 20' are shown partially embedded in flywheel 12. This type of mounting arrangement provides a more secure containment of magnets 18', 20' than does simple surface mounting.

Figure 5:
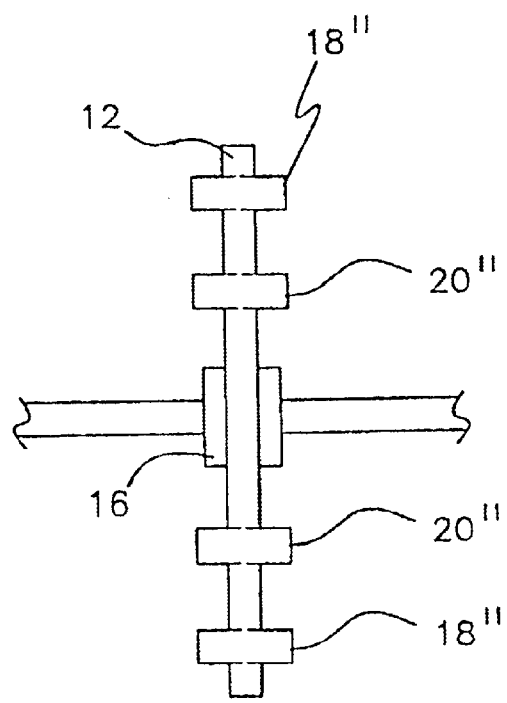
FIG. 5 is a side view of the permanent magnet equipped flywheel of the invention showing fully embedded magnets.

Referring now to FIG. 5, there is shown another embodiment of a magnet placement. Magnets 18" and 20" are shown extending completely through flywheel 12. Magnets 18', 20' (FIG. 4), 18" and 20" are shown projecting beyond the surface of flywheel 12. This is not necessary and, indeed, it may be preferable in some environments to keep the surfaces of magnets 18', 20', 18" and 20" flush with the surface of flywheel 12.

In operation, the placement of magnets in at least two concentric rings allows for excellent control of both velocity and torque from the radial/rotary propulsion system.

Figure 7:
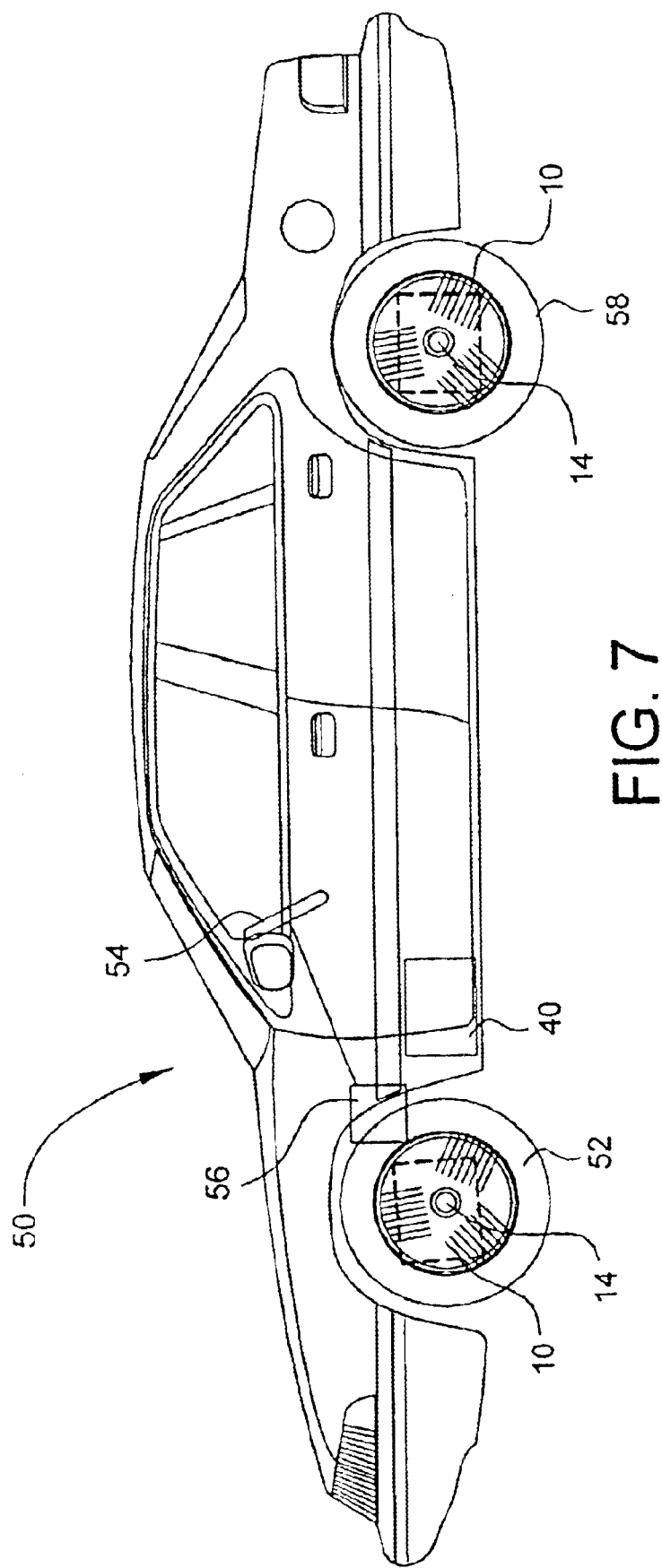
FIG. 7 is a schematic view of an electrically powered vehicle utilizing the radial/rotary propulsion system of the invention for the drive wheels.

Referring now to FIG. 6, there is shown a system schematic block diagram of the instant invention. A rechargeable battery 38 is connected to a controller/sequencer 40. Recharge power for battery 38 is applied to controller/sequencer 40 at recharge input (alternator) connection 42. Throttle 44 and brake 46 control signals are applied to controller/sequencer 40. It will be obvious to those skilled in the art that the throttle and brake signals may be generated by a wide variety of transducers known to those skilled in the art. In addition, it will be obvious to those skilled in the design of land vehicles that inputs other than throttle and brake may be required to make a fully functional vehicle control system. These inputs could readily be added to controller/sequencer 40, if required. Controller/sequencer 40 includes capacitive discharge circuits (not shown) which allow energy from battery 38 to relatively slowly charge one or more capacitors (not shown). When controller/sequencer 40 energized one or more electromagnets 26, 28, a high energy, short duration pulse may be provided to electromagnets 26, 28. Capacitive discharge circuits are also well known to those skilled in the electrical engineering arts. Controller/sequencer 40 provides a plurality of outputs to electromagnets 26, 28 (FIG. 2). There may be as many outputs from controller/sequencer 40 as there are electromagnets 26, 28, each electromagnet being individually controlled. In alternate embodiments, groups of electromagnets associated with each of the first magnet group 22 (FIG. 1) and/or the second magnet group 24 (FIG. 1) could be combined (i.e., multiple electromagnets in each group could be simultaneously energized) thereby reducing the number of switching components (not shown) within controller/sequencer 40 and simplifying the electromagnet wiring (not shown). Under most circumstances, electromagnets 26, 28 which correspond to magnets 18, 20 which are diametrically opposed, will be fired simultaneously. This practice tends to equalize lateral thrust stresses on bearing 16 (FIGS. 1 and 2) and tends to provide smoother control of the inventive system. It should, however, be obvious to those skilled in the motor control arts that alternate control arrangements could be provided to accommodate a particular operating circumstance or environment Referring finally to FIG. 7, there is shown a schematic of a typical electrically powered vehicle, reference number 50. The vehicle 50 chosen for purposes of disclosure is equipped with four wheels. It should be obvious that the radial/rotary propulsion system of the invention could readily be applied to many different vehicle configurations from a unicycle to a multi-wheeled transport vehicle. Front wheels 52, each equipped with a radial/rotary propulsion system, are coupled to a steering wheel 54 by means of steering box 56. Vehicle 50 is also equipped with a pair of rear wheels 58 which may also be equipped with the radial/rotary propulsion system of the instant invention. In still other embodiments, four wheel drive could be provided, front and rear wheel being independently equipped with the radial/rotary propulsion system of the present invention. In alternate embodiments, only rear wheels 58 may be equipped with the radial/rotary propulsion systems. In still other embodiments, the vehicle could remain essentially conventional and only the engine be eliminated and replaced with a radial, rotary propulsion system mounted to the transmission. Controller/sequencer 40 is shown located in the front of vehicle 50 but could readily be located any convenient place within the body of vehicle 50. Battery 38 (FIG. 6) has not been shown in vehicle 50. In common practice, battery 38 is made from multiple cells of the lead/acid type which many be distributed through the vehicle as required for good weight distribution and acceptable body styling, It should be obvious that in alternate embodiments, electromagnets could be deployed on or in the flywheel in concentric, circular patterns and permanent magnets could be located adjacent the flywheel. Power to the electromagnets could be provided through slip rings or in other manners well known in the art.

It is to be understood that the present invention is not limited to the embodiments described above, but encompasses any and all embodiments within the scope of the following claims.

I claim:

1. A radial/rotary propulsion system, comprising:
   a) a single flywheel comprising non magnetic material, having an axis of rotation, a first face and an opposing second face;
   b) a first group of permanent magnets, comprising an even number of permanent magnets mounted with a first uniform polarity on at least one of said first and said opposing faces in a first circular array disposed concentrically around said axis of rotation at a predetermined first radius;
   c) a second group of permanent magnets, comprising an even number of permanent magnets mounted with a second uniform polarity on at least one of said first and said opposing faces in a second circular array disposed concentrically around said axis of rotation at a predetermined second radius of magnitude less than that of said first radius;
   d) a first group of electromagnets disposed proximate said flywheel to selectively repel each one of said first group of permanent magnets;
   e) a second group of electromagnets disposed proximate said flywheel to selectively interact with each one of said second group of permanent magnets; and
   f) a controller/sequencer adapted to selectively apply DC power to said electromagnets of said first group of electromagnets and said second group of electromagnets to induce a rotation of said flywheel selectively at variable torques and speeds in at least a first direction of rotation entirely through repulsion of the first group of permanent magnets by the first group of electromagnets.

2. The radial/rotary propulsion system as recited in claim 1, wherein said selective application of DC power comprises selectively applying a DC pulse to at least one electromagnet of at least one of said first group and said second group of electromagnets.

3. The radial/rotary propulsion system as recited in claim 2, wherein said controller/sequencer comprises means for generating short duration, high energy DC pulses and said selectively applied DC pulse comprises a short duration, high energy DC pulses therefrom.

4. The radial/rotary propulsion system as recited in claim 3, wherein said means for generating short duration, high energy DC pulses comprises a capacitive discharge power supply.

5. The radial/rotary propulsion system as recited in claim 2, further comprising a bearing coupling said flywheel to said axle and wherein said DC pulses are selectively applied substantially simultaneously to pairs of said electromagnets from at least one of said first group and said second group of electromagnets, electromagnets in said pairs being substantially diametrically opposed to one another, so as to minimize stress on said bearing.

6. The radial/rotary propulsion system as recited in claim 5, wherein said bearing is a one-way bearing.

7. The radial/rotary propulsion system as recited in claim 1, further comprising:
   g) a third group of permanent magnets, comprising an even number of permanent magnets mounted on at least one of said first and said opposing faces in a third circular array disposed a predetermined third radius; and
   h) a group of alternator coils disposed in proximity to said flywheel to interact with said permanent magnets of said third group of permanent magnets.

8. The radial/rotary propulsion system as recited in claim 7, wherein said controller/sequencer further comprises means for disconnecting power to said electromagnets of said first group and said second group of electromagnets, thereby establishing a coast mode of operation of said radial/rotary propulsion system.

9. The radial/rotary propulsion system as recited in claim 8, wherein said coast mode of operation comprises at least one of a dynamic braking mode and a regenerative mode of operation.

10. The radial/rotary propulsion system as recited in claim 9, wherein said controller/sequencer comprises means to recharge a battery from energy recaptured by said alternator coils during said regenerative mode of operation.

11. The radial/rotary propulsion system as recited in claim 1, wherein at least one magnet of at least one of said first magnet group and said second magnet group of permanent magnets, comprise at least one magnet imbedded in said flywheel.

12. The radial/rotary propulsion system as recited in claim 11, wherein said at least one magnet imbedded in said flywheel comprise a magnet projecting completely through said flywheel with a first magnetic pole at a first opposing face and an opposite magnetic pole as a second opposing face of said flywheel.

13. The radial/rotary propulsion system as recited in claim 1, further comprising regeneration means for converting inertial energy of said flywheel into electrical energy during a coast mode of operation.

14. The radial/rotary propulsion system as recited in claim 13, wherein said regeneration means comprises said electromagnet means interacting with at least one of said first group of permanent magnets and said second group of permanent magnets during said coast mode of operation.

15. A radial/rotary propulsion system, comprising:
a flywheel rotatably affixed to an axle, said flywheel having a pair of opposing faces;
a plurality of permanent magnets fixedly attached to at least one of said pair of opposing faces, said plurality of permanent magnets being arranged in at least two substantially concentric circles, a first group of permanent magnets in a first permanent magnet group in a first concentric circle mounted with a first uniform polarity and a second group of permanent magnets in a second permanent magnet group in a second concentric circle mounted with a first uniform polarity, each of said first and said second substantially concentric circles also being essentially concentric with said axle;
a first plurality of electromagnets, disposed adjacent to said flywheel and adapted to selectively interact with each one of said first permanent magnet group, thereby imparting rotary motion to said flywheel relative to said axle during a drive mode of operation entirely through repulsion of the first group of permanent magnets by the first group of electromagnets; and
a second plurality of electromagnets, disposed adjacent to said flywheel and adapted to selectively interact with each one of said second permanent magnet group; and a controller/sequencer adapted to selectively apply DC power to said electromagnets of said first plurality of electromagnets and said second plurality of electromagnets to induce a rotation of said flywheel selectively at variable torques and speeds in at least a first direction of rotation entirely through repulsion of the first permanent magnet group by the first plurality of electromagnets.

16. An electrically powered land vehicle, comprising:
a wheel equipped with a radial/rotary propulsion system comprising a flywheel rotatably affixed to an axle, said flywheel having a pair of opposing faces;
a plurality of permanent magnets fixedly attached to at least one of said pair of opposing faces, said plurality of magnets being arranged in at least two substantially concentric circles, a first group of permanent magnets in a first permanent magnet group in a first concentric circle mounted with a first uniform polarity and a second group of permanent magnets in a second permanent magnet group in a second concentric circle mounted with a second uniform polarity, each of said first and said second substantially concentric circles also being essentially concentric with said axle;
a first electromagnet means, adjacent said flywheel, adapted to selectively interact with each one of said first permanent magnet group, thereby imparting rotary motion to said flywheel relative to said axle entirely through repulsion of the first group of permanent magnets by the first electromagnet means, thereby defining a drive mode of operation during which time said vehicle is propelled in a predetermined direction; and
a second electromagnet means, adjacent said flywheel, adapted to selectively interact with each one of said second permanent magnet group; and a controller/sequencer adapted to selectively apply DC power to said electromagnets of said first electromagnet means and said second electromagnet means to induce a rotation of said flywheel selectively at variable torques and speeds in at least a first direction of rotation entirely through repulsion of the first group of permanent magnets by the first electromagnet means.

17. The electrically powered land vehicle as recited in claim 16, further comprising controller/sequencer means operatively connected to said radial/rotary propulsion system, for determining said predetermined direction of travel and for controlling at least the speed of said vehicle.

18. The electrically powered land vehicle as recited in claim 17, wherein said controller/sequencer further comprises braking control means whereby said vehicle is slowed by recapture of inertial energy from said flywheel.

19. The electrically powered land vehicle as recited in claim 18, further comprising at least two wheels, each wheel equipped with a radial/rotary propulsion system; and steering means operatively connected to said controller/sequencer whereby the direction of travel of said vehicle is at least partially determined by selective control of each of said two radial/rotary propulsion systems under the control of said controller/sequencer.

* * * * *